United States Patent [19]

Chang et al.

[11] Patent Number: 5,731,093
[45] Date of Patent: Mar. 24, 1998

[54] METALLIZED FILM STRUCTURE AND ITS PRODUCTION

[75] Inventors: Wei H. Chang, Neshanic Station; Shaw-Chang Chu, Princeton Junction, both of N.J.; James A. Johnson, Jr., Farmington, N.Y.

[73] Assignee: Mobil Oil Corporation, Fairfax, Va.

[21] Appl. No.: 976,827

[22] Filed: Nov. 16, 1992

[51] Int. Cl.$^6$ .............................. B32B 15/08; B32B 27/00
[52] U.S. Cl. .................. 428/463; 428/349; 428/461; 428/518; 428/520
[58] Field of Search .................. 428/461, 463, 428/520, 518, 349, 347, 353

[56] References Cited

U.S. PATENT DOCUMENTS

| | | | |
|---|---|---|---|
| 3,433,777 | 3/1969 | Brunson | 525/285 |
| 3,725,184 | 4/1973 | Scopp | 428/203 |
| 3,949,114 | 4/1976 | Viola et al. | 428/463 X |
| 4,345,005 | 8/1982 | All et al. | 428/461 |
| 4,474,928 | 10/1984 | Hoenig et al. | 525/186 |
| 4,590,125 | 5/1986 | Balloni et al. | 428/349 |
| 4,599,275 | 7/1986 | Hayashi et al. | 428/461 |
| 4,604,322 | 8/1986 | Reid | 428/332 |
| 4,692,379 | 9/1987 | Keung et al. | 428/349 |
| 4,692,380 | 9/1987 | Reid | 428/349 |
| 4,764,425 | 8/1988 | Balloni et al. | 428/349 X |
| 4,937,139 | 6/1990 | Genske et al. | 428/518 X |
| 5,019,447 | 5/1991 | Keller | 428/327 |
| 5,073,421 | 12/1991 | Akao | 428/463 X |
| 5,093,194 | 3/1992 | Touhsaent et al. | 428/353 X |
| 5,110,642 | 5/1992 | Genske | 428/461 X |
| 5,153,074 | 10/1992 | Migliorini | 428/463 |

*Primary Examiner*—Daniel Zirker
*Attorney, Agent, or Firm*—Marina V. Schneller; Dennis P. Santini

[57] ABSTRACT

A metallized film combination of an oriented polymeric substrate layer having on one surface thereof a coating of a blend of (a) a vinyl alcohol homopolymer or copolymer and (b) a vinylidene chloride copolymer, the coating blend having a metal layer thereon. The method involves coating the substrate after the substrate has been machine direction oriented and before the combination is transverse direction oriented followed by TD orientation and finally by depositing a metal layer on the blend surface.

15 Claims, No Drawings

METALLIZED FILM STRUCTURE AND ITS PRODUCTION

FIELD OF THE INVENTION

The present invention relates to a metallized film structure that exhibits superior barrier properties. The metallized film is composed of a polymeric substrate such as polypropylene; a primer layer consisting of a blend of (a) a vinyl alcohol homopolymer or copolymer and (b) a vinylidene chloride copolymer; and a metal layer deposited on the primer layer. These composites are highly advantageous in packaging moisture and/or oxygen sensitive materials because of their excellent barrier properties.

BACKGROUND OF THE INVENTION

Polypropylene films have found wide acceptance in the packaging industry, especially in food packaging, because of their superior physical properties. Polypropylene film, usually biaxially oriented, is characterized by high tensile modulus and stiffness and excellent optical clarity.

Oriented plastic films, particularly biaxially oriented polypropylene films are used widely as packaging materials for a variety of products including many popular snack food such as crackers, nuts, and potato chips.

In many instances, metal coated plastic films have replaced metallic foils for applications such as labels and decals, decorative products, solar window films, and packaging films. In food packaging, metallized films are used to hinder the onset of oxidative rancidity of the products either prepared in or served with certain edible oils by reducing the passage of oxygen, moisture, visible and ultraviolet lights. Unfortunately, the metal to film bonding can fail in many applications due to the flexibility of the plastic film substrate, thereby causing the metal to be removed from the film and reducing the barrier properties.

Coatings and additives for use in production of films which contact foods must be in conformity with the requirements and regulations of the U.S. Food and Drug Administration. Coatings and additives for polypropylene which do not conform to the requirements can not be exploited in the market for polypropylene films, as food packaging materials.

It is an object of the invention to improve the integrity of the polypropylene supported metal coatings.

It is an object of the invention to improve the integrity of the bonding and adhesion of polypropylene supports to metal coatings.

It is an object of the invention to improve the polypropylene supported metal coatings as gas barriers.

It is an object of the invention to reduce gas permeability of polypropylene supported metal coatings as gas barriers.

It is an object of the invention to reduce water vapor permeability of polypropylene supported metal coatings as gas barriers.

It is an object of the invention to reduce oxygen permeability of polypropylene supported metal coatings as gas barriers.

SUMMARY OF THE INVENTION

In accordance with the present invention, a metallized film composite comprises an oriented polymer substrate, a primer layer composed of a blend of (a) a vinyl alcohol homopolymer or copolymer and (b) a vinylidene chloride copolymer on at least one of the substrate surface, and a metal layer on the primer layer.

The invention is also concerned with a method of forming the metallized film composite comprising (i) stretching the multilayer film in the machine direction (MD), (ii) applying to the MD oriented film the primer coating, (iii) stretching the coated film in the transverse direction (TD), and (iv) depositing on the primer surface the metal layer. Before the blend is applied to the MD oriented film it is preferred to corona discharge treat the substrate surface for improved surface wettability. In addition, after the coated film has been biaxially oriented it is preferred to corona discharge treat the coated surface preparatory to applying the metal to the surface.

DESCRIPTION OF PREFERRED EMBODIMENTS

The substrates contemplated herein include any polymeric film substrate which inherently permits the transmission of oxygen and water vapor and wherein the utility of such film would call for a minimization of such transmission. In most cases, the source of oxygen and water vapor referred to herein is atmospheric oxygen and water vapor. While nylon, polyethylene terephthalate, polycarbonate, etc. films are contemplated herein, the particularly preferred class of films are polyolefins. Within the polyolefin class, homopolymers and copolymers of propylene are preferred. Particularly preferred are isotactic polypropylenes containing at least 80% isotacticity. The preferred base substrate layer can be a homopolypropylene having a melting temperature in the range of 320° to about 340°. A commercially available material of this description is Exxon 4252 or Fina 3378. Copolymers of propylene with another olefin monomer, preferably ethylene can also be used.

It is preferred to coextrude on one side of the base polymer substrate with an adhesive layer comprising a maleated polyolefin and on the other side of the base film with a heal-seal layer comprising an olefin copolymer or terpolymer. The maleated polyolefins may be derived from maleic acid or its anhydride, copolymerized with a polyolefin. The maleated polyolefins can be prepared by any process, for example, that disclosed in U.S. Pat. No. 3,433,777. Although any polyolefin is contemplated for modification, polypropylene is preferred. The heat-seal layer comprises ethylene-propylene copolymers and ethylene-propylene-butene-1 terpolymers. The heat-seal layer is usually modified by a small amount of a fatty acid amide, microcrystalline wax, silicone oil, and/or antiblocking agent for improved machinability, as taught in U.S. Pat. No. 4,590,125, 4,692,379, and 4,764,425.

The vinyl alcohol polymers employed herein can be any commercially available material. They are derived from the hydrolysis of vinyl acetate polymer or copolymer. As a result, their hydrolysis level can vary. Typically, the hydrolysis level of commercial grades of polyvinyl alcohol varies from 87% to 99.3+%. For example, Vinol 125 is a 99.3+% super hydrolyzed, medium viscosity polyvinyl alcohol, Vinol 325 is a 98% hydrolyzed, medium viscosity polyvinyl alcohol, and Vinol 523 is a 88% hydrolyzed, medium viscosity polyvinyl alcohol, all of which are obtained from Air Products Inc. The vinyl alcohol polymers also include ethylene-vinyl alcohol copolymers (EVOH) obtained from any commercial source. For example, EVOH is available under the trade name EVAL from Kuraray Company, Ltd. of Japan. This material contains about 25 to 50% mole of ethylene.

The vinylidene chloride copolymers are preferably water based emulsions composed of 70–90% vinylidene chloride and 30–10% comonomer. The comonomer can be one or more polymerizable materials selected from the group consisting of methyl acrylate, ethyl acrylate, butyl acrylate, methyl methacrylate, acrylonitrile, vinyl chloride, acrylic acid, methacrylic acid, hydroxyethyl acrylate, hydroxyethyl methacrylate, etc. For example, Daran 8600 is a terpolymer of vinylidene chloride, methyl methacrylate, and acrylic acid, Daran 8300 is a terpolymer of vinylidene chloride, ethyl acrylate, and methacrylic acid, both of them are obtained from W. R. Grace & Co.

The blend of (a) and (b) supra comprises about 5–90% by dry weight of the vinyl alcohol polymer and about 95–10 by dry weight of the vinylidene chloride copolymer. The blend of (a) and (b) supra may be further modified by additives and/or modifiers such as antiblocking agents, defoamers, and crosslinkers.

As indicated above, to obtain good adhesion between the metal film and the surface of the blend of the present invention, it is preferred to subject the surface to a corona discharge treatment. This is a conventional treatment and is carried out in a known manner to a dyne value of about 36–60 dynes/cm and preferably 40–50 dynes/cm.

The metal coating can be applied to the corona-treated blend layer by any known method, such as, electroplating, sputtering, or vacuum deposition. Vacuum deposition is a preferred method. The most frequently used coating metal is aluminum, although other metals such as gold, silver, chrome and copper are also contemplated. The metal layer has a thickness in the range of 0.04 to 0.08 micron (or 400 to 800 Angstrom). The metal thickness may be more conveniently reflected by the light transmission or optical density of the film. An optical density in the range of 1.5 to 3.0 is preferred.

In accordance with the invention, a layer of a blend of polyvinyl alcohol polymer and/or copolymer with a vinylidene chloride copolymer is disposed on the substrate. If there is a skin layer of maleic anhydride containing polypropylene on the base support, then preferably the blend of polyvinyl alcohol polymer and/or copolymer with a vinylidene chloride copolymer is disposed on the maleic anhydride modified skin layer. The coating is preferably applied to the maleic anhydride modified-film surface between the machine direction and transverse direction orientation. The coated film thus obtained, useful in food packaging, has significantly improved bond strength over a similar coated film without the maleic anhydride modification.

In the ultimate product, the coating of polyvinyl alcohol polymer and/or copolymer and polyvinyldiene chloride copolymer, on the biaxially oriented substrate, has a thickness between 0.1 to 1 micron. The coating weight in the ultimate product, the coating of polyvinyl alcohol polymer and/or copolymer and polyvinyldiene copolymer, on the biaxially oriented substrate, ranges from 0.05 to 0.5 mg./sq. in. Even at the low levels necessary to improve adhesion the coating also improves gas barrier properties of the metallized product. Not only does the ultimate product exhibit improved oxygen barrier properties but also enormously reduced water vapor transmission rate. This is attributed to the synergistic effect of the combination of the polyvinyl alcohol polymer and/or copolymer with a vinylidene chloride copolymer.

The polyvinyl alcohol and polyvinylidene chloride blend is preferably applied to the longitudinally oriented film. In a preferred embodiment, it is applied as a dispersion composition. Preferably, the dispersion comprises an aqueous medium. The use of water as the dispersing medium minimizes cost while, at the same time, optimizing safety and minimizing environmental concerns. Those skilled in the art are aware that organic solvents create the possibility of explosion, fire and environmental problems. These concerns are eliminated by the use of water as the solvent. The aqueous blends can be used in any concentration. Generally, the aqueous blends having solids content in the range of 4 to 10% are suitable for gravure coating application.

In another aspect of the present invention the above-described coated film may be part of a composite film wherein the coated film is laminated onto or supported by another film ply which may be a plastic, paper, or another metallized film. In one embodiment, the composite film of the present invention is a laminate of the coated film of the present invention and a glassine film. In another embodiment, the composite film of the present invention comprises a laminate of one sheet of composite of the invention laminated to a second sheet of composite of the present invention.

The above discussed coated polypropylene-containing film is formed in a process wherein a polypropylene thermoplastic resin, which comprises the relatively thick polypropylene base layer, is melted and extruded through a slit die. If the skin layer comprising the maleic anhydride modified thermoplastic is employed, it is preferably coextruded with the base layer. The molten polypropylene-containing thermoplastic is cooled to form a solid sheet which is oriented in the longitudinal direction. A polyvinyl alcohol/polyvinylidene chloride dispersion is coated onto the surface of the longitudinally oriented film. The film is thereafter oriented in the transverse direction to form a biaxially oriented coated film.

In a preferred embodiment of this process the molten polypropylene-containing thermoplastic is initially extruded through a slit die and cast onto a cooling drum wherein it is quenched to form a solid sheet. In a still more preferred embodiment, the quenching of the thermoplastic melt on the cooling drum is followed by reheating of the sheet prior to orienting in the longitudinal direction.

The step of orienting the thermoplastic sheet in the longitudinal direction is, in a preferred embodiment, provided by longitudinal direction stretching. Preferably, stretching in the longitudinal direction involves longitudinal stretching such that the film is increased from about 3 times to about 8 times its original length. More preferably, the film is increased from about 4 times to about 6 times its original length.

In a further preferred embodiment of the present invention the longitudinally stretched film, prior to the application of the coating layer, is surface treated to improve surface wettability. Preferably, this surface treatment is provided by corona treatment or flame treatment. In a particularly preferred embodiment of this surface treatment step the surface that is subsequently coated is corona treated.

In a preferred embodiment of the subsequent step, the step of coating the surface, that step is provided by gravure coating. The gravure coating step, in this preferred embodiment, is conducted by utilizing a gravure coater. Other coating methods known in the art, for example, spray coating, may be substituted for the preferred use of gravure coating.

After completion of the coating operation, the film is preferably subjected to heating to accelerate drying of the coating which, as is discussed above, is applied as an aqueous composition. Drying involves exposure of the film to elevated temperature. Depending upon the temperature employed in drying the coated monoaxially oriented film, the film may or may not be cooled or heated to obtain optimum temperature conditions during the next step, transverse orientation.

In the final essential step, the longitudinally oriented, coated film is oriented in the transverse direction. Preferably, orientation in the transverse direction is accomplished by transverse stretching. In the preferred embodiment wherein stretching is utilized to orient the film in the transverse direction, the film is stretched from about 4 to about 10 times its original width. More preferably, the longitudinally oriented film is stretched from about 5 to about 9 times its prestretched width.

In a preferred embodiment of this process, the film is annealed following transverse direction orientation. Annealing of the biaxially oriented film involves exposure of the film to elevated temperature. As in all heating steps, preferred temperatures are a function of the identity and constituency of the polypropylene-containing thermoplastic resin constituting the film.

In yet a further step included in a preferred embodiment of this invention the uncoated surface of the biaxially oriented coated film is treated to improve its wettability and adhesion. Such treatment permits printing thereupon or the application of an adhesive followed by the application of another film ply to produce a laminate structure. In a preferred embodiment this surface treatment step is provided by corona treatment.

EXAMPLES

Example 1

An aqueous coating dispersion containing 4.7% solids was placed in a gravure coater, which was located between the MD orienter and the TD orienter of a pilot scale film orienter. The coating was composed of 35% by dry weight of Vinol 125 (a 99+% superhydrolyzed medium viscosity, polyvinyl alcohol, obtained from Air Products) and 65% by dry weight of Daran 8600-C (a vinylidene chloride copolymer, obtained from W. R. Grace.) A polypropylene homopolymer (Fina 3371) was extruded through a flat sheet die at 250° C., cast onto a cooling drum, and quenched at 30° C. The sheet, measured about 30 mil thick, was reheated to 140° C. and stretched 5-fold in the MD and then corona treated for improved surface wettability. When passing through the gravure coater, the MD oriented film web, now about 6 mil thick, was coated on the corona treated side with the aqueous coating dispersion. The coated web was dried in pre-heat zones at 160° C., then stretched 8-fold in the TD and annealed at 160° C. The biaxially oriented films was 20 microns in thickness and the coating layer was about 0.4 microns and had a coating weight of 0.1 mg/sq. in. The coated side of the film was subsequently vacuum-deposited with an aluminum layer approximately 0.06 micron.

Example 2

In a manner similar to Example 1, an aqueous coating dispersion of 4.6% solids containing 20 parts by dry weight of Vinol 125 and 80 parts by dry weight of Daran 8600-C was coated on the MD-oriented polypropylene film. The coated film was subsequently metallized in the same manner as that for Example 1.

Example 3

In a manner similar to Example 1, an aqueous coating dispersion of 6.2% solids containing 35 parts by dry weight of Vinol 523 (88% hydrolyzed, medium viscosity polyvinyl alcohol) and 65 parts by dry weight of Daran 8300 (a terpolymer of vinylidene chloride, methyl acrylate, and methacrylic acid) was employed. The coating was applied onto a maleic anhydride-modified polypropylene skin layer (Mitsui QF500A) after the MD orientation. The weight ratio of the skin layer to the homopolymer core layer was 5 to 70. This coated film was subsequently metallized in the same manner as that for Example 1.

Example 4

In a manner similar to Example 3, an aqueous coating dispersion of 7.7% solids comprising 20 parts by dry weight of Vinol 523 and 65 parts by dry weight of Daran 8300 was coated on the maleic anhydride modified polypropylene skin layer. The coated film was subsequently metallized in the same manner as that for Example 1.

Comparative Example A

A control film example was prepared in a manner similar to Example 1 except that the aqueous coating was omitted. The homopolymer surface was treated with corona discharge to give a surface tension of 38 dynes/cm. The treated side was coated with an aluminum layer in the same manner as that for Example 1.

The metal (to film) adhesion was evaluated by peeling off the coating using 610 Scotch tape. The barrier properties were characterized by oxygen transmission rate (OTR) and water vapor transmission rate (WVTR), using Ox-tran 1050 A and Permatran-W, respectively. Both of these instruments were manufactured by Modern Controls, Inc. The results are shown in Table 1.

TABLE 1

| | | Unmetallized | | Metallized | | |
|---|---|---|---|---|---|---|
| Example | Primer composition | OTR (3) | WVTR (4) | OTR (3) | WVTR (4) | Adhesion (5) |
| 1 | 35/65 PVOH/PVDC[1] | 35 | 0.42 | 0.19 | 0.023 | 9 |
| 2 | 20/80 PVOH/PVDC[1] | 124 | 0.44 | 0.16 | 0.030 | 9 |
| 3 | 35/65 PVOH/PVDC[2] | 32 | 0.46 | 0.60 | 0.043 | 10 |
| 4 | 20/80 PVOH/PVDC[2] | 74 | 0.47 | 0.88 | 0.039 | 10 |
| A | NONE | 310 | 0.46 | 8.9 | 0.061 | 8 |

[1] PVOH = Vinol 125, PVDC = Daran 8600-C
[2] PVOH = Vinol 523, PVDC = Daran 8300
(3) oxygen transmission rate in cc/100 sq. in./24 hr. @ 86° F. and 0% RH
(4) water vapor transmission rate in gm/100 sq. in./24 hr. @ 100° F. and 100% RH
(5) 10 = best (0% coating peel-off), 0 = worst (100% coating peel-off)

It was found by Scanning Electron Microscopy that the film made from Example 1 exhibits a unique striated and ordered metal surface structure as opposed to a random structure for the film made from Comparative Example A. It is believed that the ordered metal morphology associated with the PVOH/PVDC coated film is largely responsible for the improved barrier properties.

Thus it is apparent that there has been provided, in accordance with the invention, a metallized substrate, that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A multilayer metallized film comprising a substrate layer of oriented propylene homopolymer or copolymer, capable of transmitting oxygen and moisture, wherein the substrate layer has two surfaces at least one surface of said polymer substrate layer having a layer of a blend of (a) a polyvinyl alcohol homopolymer or copolymer and (b) a vinylidene chloride copolymer, said layer of said blend being on at least one of said two surfaces; and a metal layer on said layer of said blend;

wherein said layer of said blend is effective to reduce transmission of said oxygen and said moisture.

2. The multilayer film of claim 1 wherein the ratio of (a) to (b) is from 5:95 to 90:10.

3. The multilayer film of claim 2 wherein said blend is a blend of (a) a member selected from the group consisting of polyvinyl alcohol and ethylene-vinyl alcohol copolymer and (b).

4. The multilayer film of claim 3 wherein said blend is a blend of (a) polyvinyl alcohol and (b) a vinylidene chloride copolymer.

5. The multilayer film of claim 3 wherein one side of said polypropylene substrate carries a heat-seal skin layer.

6. The multilayer of claim 5 wherein said heat-seal skin layer is a copolymer of ethylene and propylene or a terpolymer of ethylene, propylene and butene-1.

7. The multilayer film of claim 3 wherein a second side of said polypropylene substrate is modified by a maleic anhydride grafted polypropylene homopolymer or copolymer.

8. The multilayer film of claim 1, wherein the metal layer comprises a metal selected from the group consisting of aluminum, gold, silver, chrome and copper.

9. The multilayer film of claim 1, wherein the metal is aluminum.

10. The multilayer film of claim 4, wherein the metal layer comprises a metal selected from the group consisting of aluminum, gold, silver, chrome and copper.

11. The multilayer film of claim 10, wherein the metal is aluminum.

12. The multilayer film of claim 1, wherein the blend is an aqueous blend.

13. The multilayer film of claim 8, wherein the blend is an aqueous blend.

14. The multilayer film of claim 9, wherein the blend is an aqueous blend.

15. The multilayer film of claim 10, wherein the blend is an aqueous blend.

* * * * *